US007948367B1

(12) United States Patent
Arauza (10) Patent No.: US 7,948,367 B1
(45) Date of Patent: May 24, 2011

(54) WIRELESS ILLUMINATED INDICATORS FOR MOTORCYCLE HELMETS (76) Inventor: Alexander M. Arauza, Princeton, IL (US)

( * ) Notice: Subject to any disclaimer, the term of this patent is extended or adjusted under 35 U.S.C. 154(b) by 454 days.

(21) Appl. No.: 12/148,004

(22) Filed: Apr. 16, 2008

Related U.S. Application Data (60) Provisional application No. 60/923,528, filed on Apr. 16, 2007.

(51) Int. Cl.
*B60Q 1/34* (2006.01)
(52) U.S. Cl. .................. 340/475; 340/691.1; 340/332
(58) Field of Classification Search ............. 340/475, 340/479, 691.1, 693.5, 432, 453, 464–468, 340/332, 489, 459
See application file for complete search history.

(56) References Cited

U.S. PATENT DOCUMENTS

| | | | |
|---|---|---|---|
| 4,435,966 A * | 3/1984 | Craig | 70/161 |
| 4,956,752 A | 9/1990 | Foglietti | |
| 5,040,099 A * | 8/1991 | Harris | 362/473 |
| 5,416,675 A * | 5/1995 | DeBeaux | 362/106 |
| 5,704,707 A | 1/1998 | Gebelein et al. | |
| 5,910,764 A * | 6/1999 | Hayden | 340/479 |
| 6,406,168 B1 * | 6/2002 | Whiting | 362/473 |
| 6,914,520 B2 * | 7/2005 | Chung | 340/332 |
| 2007/0285221 A1 * | 12/2007 | Howe et al. | 340/479 |

* cited by examiner

*Primary Examiner* — Daniel Previl
(74) *Attorney, Agent, or Firm* — Montgomery Patent and Design; Robert C. Montgomery (57) ABSTRACT A wireless braking and turning indicator attached to a motorcycle helmet and a motorcycle mounted transmitter is herein disclosed. An illumination assembly is attached on the rear surface of the helmet by means of either double-sided adhesive or an elastic band. An integral wireless receiver powered by a rechargeable battery receives a signal from a transmitter mounted on the motorcycle and electrically connected to the brake and turn signal indication circuits. In such a manner, the helmet-mounted light assembly will illuminate whenever the motorcycle brakes are applied in much the same manner as a center-mounted high brake light on motor vehicles. Turning direction is also indicated in like manner. When used, the rider's head is at a sufficient elevation to be easily seen by following traffic.

20 Claims, 4 Drawing Sheets

WIRELESS ILLUMINATED INDICATORS FOR MOTORCYCLE HELMETS

RELATED APPLICATIONS

The present invention was first described in and claims the benefit of U.S. Provisional Application No. 60/923,528 filed on Apr. 16, 2007, the entire disclosures of which are incorporated herein by reference.

FIELD OF THE INVENTION

The present invention relates generally to a wireless illumination display system detachably mounted thereto a motorcycle helmet comprising a motorcycle mounted transmitter assembly, an electrical connection means thereto existing motorcycle brake and turn signal indicators, a receiver assembly integral therein an illuminating display unit powered by rechargeable power source.

BACKGROUND OF THE INVENTION

Automobile accidents are among the leading causes of injury and death in the United States today. According to the United States Department of Transportation, Motorcycle fatalities and the related fatality rate have been significantly increasing over the last ten (10) years. Between 1996 and 2005, motorcyclist fatalities increased more than one hundred ten percent (110%) and now account for more than ten percent (10%) percent of all motor vehicle traffic crash fatalities. Over this period, motorcycle registrations increased sixty-one percent (61%), while the reported Vehicle Miles of Travel (VMT) for motorcycles increased only eight-point-six percent (8.6), resulting in a ninety-four percent (94%) increase in the motorcycle fatality rate. Many of these accidents and the injuries and deaths that occur can be attributed to inadequate reaction time by other motorists. While the central high-mounted brake lights on motor vehicles have been proven to help in this regard, not all modes of transportation (including motorcycles) are equipped with this safety figure.

Motor vehicle accidents, particularly motorcycle accidents are among the leading causes of injury and death in the United States today. Many of these accidents and the injuries and deaths that occur as a result thereof, however, can be attributed to inadequate reaction time. The severity of the accident, whether resulting from poor weather, improper following distance, driver impairment or the like, could usually be reduced or perhaps avoided entirely if there were just a few more seconds of braking time available. The additional split seconds of reaction time afforded by the current invention to following motorists may be all that is needed to help save lives. Accordingly, a need exists for a means by which motorists following motorcycles can be afforded more braking reaction time. The development of the present invention fulfills this need.

U.S. Pat. No. 6,914,520 filed by Chung discloses a helmet warning device. This patent does not appear to disclose a signal display that is configured to be somewhat flexible with a foam elastomeric backing and is attached utilizing a suitable weatherproof adhesive or double-sided tape.

U.S. Pat. No. 6,406,168 filed by Whiting discloses a helmet mounted brake light. This patent does not appear to disclose a signal display that is configured to be somewhat flexible with a foam elastomeric backing and is attached utilizing a suitable weatherproof adhesive or double-sided tape.

U.S. Pat. No. 5,910,764 filed by Hayden discloses a brake light system for helmets. This patent does not appear to disclose a wireless brake light that can be retrofitted onto an existing motorcycle helmet.

U.S. Pat. No. 5,704,707 filed by Gebelein and Varner discloses a motorcycle safety helmet system. This patent does not appear to disclose a wireless retrofitted brake light for a motorcycle helmet that uses an RF signal.

U.S. Pat. No. 5,040,099 filed by Harris discloses a motorcycle safety helmet. This patent does not appear to disclose a wireless retrofitted brake light for a motorcycle helmet that uses an RF signal and is capable of communicating information regarding the use of turn signals.

U.S. Pat. No. 4,956,752 filed by Foglietti discloses a cyclops lighted motorcycle helmet. This patent does not appear to disclose a wireless brake light that can be retrofitted onto an existing motorcycle helmet.

SUMMARY OF THE INVENTION

In view of the foregoing disadvantages inherent in the prior art, it has been observed that there is need for wireless retrofitted brake light that attaches to a motorcycle helmet.

The wireless retrofitted brake light for motorcycle helmet comprises wireless brake and turn signal indicators being attached thereto existing motorcycle helmets by a user. The braking and turning light display unit is attached thereto a rear surface of the helmet by means of either double-sided adhesive or an elastic strap and is electrically powered by a rechargeable battery pack. The light display unit receives a radio frequency (RF) signal therefrom a transmitter assembly in electrical communication with existing brake and turn signal indication circuits of the motorcycle. The helmet-mounted light display unit will illuminate a red brake light whenever the motorcycle brakes are applied, in much the same manner as a center-mounted high brake light on motor vehicles. The light display unit also indicates turning direction by illumination of a left turn signal assembly and a right turn signal assembly.

A further aspect of the wireless retrofitted brake light for motorcycle helmet is to elevate location of the light display unit indicators to provide increased visibility thereto following traffic.

A further aspect of the wireless retrofitted brake light for motorcycle helmet is to reduce motorcycle user death and injury by providing a more visible brake and turn signal indicator to following traffic. This increased visibility will lead to faster reaction time and increased braking time for following motorists. The additional split seconds of reaction time afforded by the current invention to following motorists may be all that is needed to help save lives.

Another object of the wireless retrofitted brake light for motorcycle helmet comprises a light display unit and a transmitter assembly. The light display unit comprises an integral RF receiver and is mounted thereto a rear surface of a conventional motorcycle helmet. The light display unit is affixed thereto the helmet using a semi-permanent adhesive element. The functionality of the light display unit mimics the functionality of conventional motorcycle mounted indicator lights. The light display unit is wireless such as to not impede the motorcycle rider.

Yet another object of the wireless retrofitted brake light for motorcycle helmet further comprises a light display unit powered by a rechargeable battery pack and that receives control RF signals wirelessly from the motorcycle mounted transmitter assembly. In addition to the brake indication functionality of the apparatus, the light display unit also provides indication of intended turning direction as well. Such indication is accomplished by the use of an integral left turn signal assembly and an integral right turn signal assembly located at opposing outer edge regions thereof being sequentially illuminated in a path to the right or the left to indicate an upcoming right or left turn respectively. The signal assemblies further comprise arrow-shaped lamp arrays.

Still yet another object of the wireless retrofitted brake light for motorcycle helmets comprises a light display unit further comprising a brake light assembly, a left turn signal assembly, and a right turn signal assembly mounted atop a flexible backplane enclosure. The flexible nature of the flexible backplane enclosure allows the light display unit to conform itself to a profile of the motorcycle helmet. The light display unit fits snugly and securely against the motorcycle helmet. A battery pack access door is provided on the light display unit which houses a rechargeable battery pack.

Yet another object of the wireless retrofitted brake light for motorcycle; helmet comprises a battery pack that is recharged through a recharging port. The recharge unit comprises a common 120V AC to DC adapter with expected features such as a mating electrical connector, a cord, and a plug. Located thereupon an external side surface of the flexible backplane enclosure is a receiver reset pushbutton which pairs the receiver portion of the light display unit therewith a specific transmitter assembly. Also located on an external side surface of the flexible backplane enclosure is a power switch which allows the light display unit and affixed lighted lamps to be de-energized during periods of non-use, or when two or more motorcycle riders are on a motorcycle so that only the most rearward motorcycle rider is provided with an operational light display unit.

Still yet another object of the wireless retrofitted brake light for motorcycle helmet comprises a transmitter assembly that comprises a weatherproof plastic enclosure, a transmitter unit, and a wiring harness. The connection wiring harness extends from the weatherproof plastic enclosure with adequate length to allow for termination anywhere on the motorcycle.

Yet another object of the wireless retrofitted brake light for motorcycle helmet comprises a connection wiring harness with a minimum of four (4) individual conductors as follows: (1) ground connection, (2) brake signal connection, (3) right turn signal connection, and (4) left turn signal connection.

A further aspect of the wireless retrofitted brake light for motorcycle helmets is whenever a signal therefrom the motorcycle brake system, or a signal therefrom one of the turn signal indications is initiated by the operator, power would be applied to the transmitter unit and a corresponding wireless RF signal would emanate therefrom.

Still a further aspect of the wireless retrofitted brake light for motorcycle helmet is that connection from the connection wiring harness to the associated corresponding wire or electrical connection on the motorcycle would be made in such a manner so that the integrity of the original motorcycle wiring is not negatively impacted.

Yet another object of the wireless retrofitted brake light for motorcycle helmet comprises molded mounting apertures located at each corner area. Said materials are to be supplied with the weatherproof plastic enclosure for said attachment options as well as additional means such as double-faced tape, a hook-and-loop strip, or the like.

Another object of the wireless retrofitted brake light for motorcycle helmet is a transmitter reset pushbutton is located on the side of the weatherproof plastic enclosure. The transmitter reset pushbutton is used to pair the weatherproof plastic enclosure with a specific light display unit. It is envisioned that the transmitter assembly would be provided as part of a kit which would include the light display unit. The transmitter assembly could also be supplied as standard or optional equipment on new motorcycles.

Yet another object of the wireless retrofitted brake light for motorcycle helmet comprises an attachment means for attaching the light display unit to a conventional motorcycle helmet. Depiction of said preferred attachment method is of a semi-permanent nature and would be used for long periods of time. In said installation, the light display unit, comprising the outward facing lens assemblies and the flexible backplane enclosure held in place with the use of an adhesive element. The adhesive element comprises common weatherproof double-sided foam tape but could incorporate other attachment means provided that they do not negatively impact the structural integrity or safety of the motorcycle helmet.

The wireless retrofitted brake light for a motorcycle helmet, in an alternate embodiment comprises a system for temporary use comprising the light display unit held in place with the use of a mechanical strap. The strap further comprises a pair of metal strap hooks at distal ends thereto being attached to opposing outer edges of a front opening of the motorcycle helmet. The alternate attachment method of coupling the light display unit thereto the motorcycle helmet would not impact the structural integrity or safety of the motorcycle helmet.

A further object of the wireless retrofitted brake light for motorcycle helmet comprises a power switch that allows the rechargeable battery pack to be conserved when the apparatus is not in use.

Yet a further object of the wireless retrofitted brake light for motorcycle helmet comprises an illumination means array as an output of the receiver module. The illumination means array comprises high-intensity light emitting diodes (LED's) as shown due to their low power consumption, long life and good visibility. Other illumination means can also used.

A method for installing and utilizing a wireless retrofitted brake light for motorcycle helmet that may be used by performing the following steps: procuring a particular model of the wireless retrofitted brake light for motorcycle helmet; fastening the light display unit to the motorcycle helmet using the adhesive element; charging the rechargeable battery pack by connecting the recharge unit thereto the recharging port on the flexible backplane enclosure and plugging said recharge unit into a common household 120 V outlet; installing the transmitter assembly by positioning in a secure, but accessible location, on the motorcycle; routing the connection wiring harness to a suitable location where electrical connections can be made to the motorcycle wiring system comprising the following four signals; (1) ground connection, (2) brake signal connection, (3) right turn signal connection, and (4) left turn signal connection; performing the pairing process to enable the association of one (1) transmitter unit thereto one receiver module; and, benefiting from improved motorcycle riding safety due to increased visibility of braking and turning indicators afforded a user of the present invention.

The method of installing and utilizing the alternate attachment method of the wireless retrofitted brake light for motorcycle helmet may be achieved by performing the following additional steps: affixing the light display unit to the motorcycle helmet using the strap and strap hooks being attached thereto opposing outer edges of a front opening of the motorcycle helmet in lieu of the aforementioned preferred adhesive element.

A further object of the wireless retrofitted brake light for motorcycle helmet is to comprise a pairing process to align the transmitter unit and receiver in combination to each other to prevent interference therefrom additional users of the apparatus being in close proximity. In this manner, two motorcycles, both equipped with the apparatus can ride near one another without causing cross-activation. Such a process is necessary when buying a new helmet or motorcycle which may have the features of the apparatus already installed. The pairing feature also allows the light display unit to be used with multiple or different transmitters assemblies provided on different motorcycles.

A method for installing and utilizing a wireless retrofitted brake light for motorcycle helmet and performing the pairing process includes the user applying power to the light display unit through use of the power switch. With the brake system on the motorcycle activated to apply power to the transmitter assembly, the user would press both the first reset pushbutton and the second reset pushbutton simultaneously or within a short time of one another; in this training or learning mode, the signature of the transmitter unit would be learned by the receiver module and only respond to the paired transmitter unit in the future until it is re-paired with another transmitter unit.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | wireless illuminated indicator apparatus |
| 15 | light display unit |
| 20 | conventional motorcycle helmet |
| 25 | motorcycle rider |
| 30 | brake light |
| 32 | left turn signal |
| 33 | right turn signal |
| 35 | motorcycle |
| 40 | individual lighted segments |
| 45 | brake light assembly |
| 47 | left turn signal assembly |
| 48 | right turn signal assembly |
| 50 | flexible backplane enclosure |

-continued

| | |
|---|---|
| 55 | battery pack access door enclosure |
| 60 | recharging port |
| 62 | recharge unit |
| 65 | receiver reset pushbutton |
| 70 | power switch |
| 75 | transmitter assembly |
| 77 | transmitter unit |
| 80 | weatherproof plastic |
| 82 | mounting aperture |
| 85 | connection wiring harness |
| 90 | transmitter reset pushbutton |
| 95 | adhesive element |
| 100 | strap |
| 102 | strap hook |
| 105 | motorcycle wiring system |
| 110 | RF signal |
| 115 | receiver module |
| 120 | rechargeable battery pack |
| 125 | illumination means array |

DETAILED DESCRIPTION OF THE PREFERRED EMBODIMENT

Figure 3:
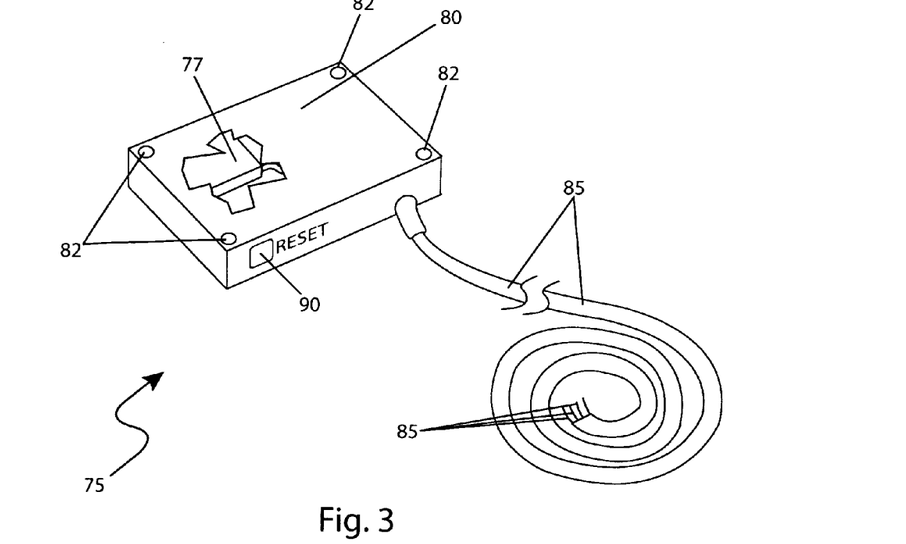
FIG. 3 is a perspective view of the transmitter assembly 75, according to the preferred embodiment of the present invention.
Figure 4:
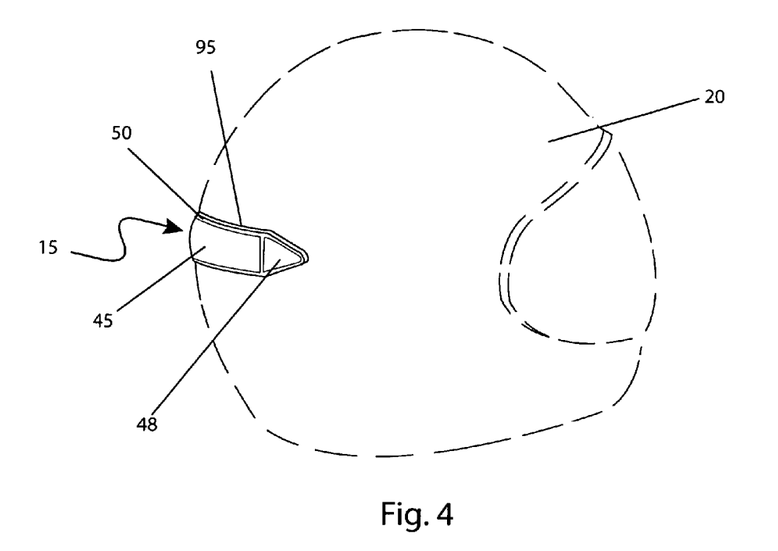
FIG. 4 is a perspective view of the preferred attachment method of the light display unit 15 thereto a conventional motorcycle helmet 20, according to the preferred embodiment of the present invention.
Figure 5:
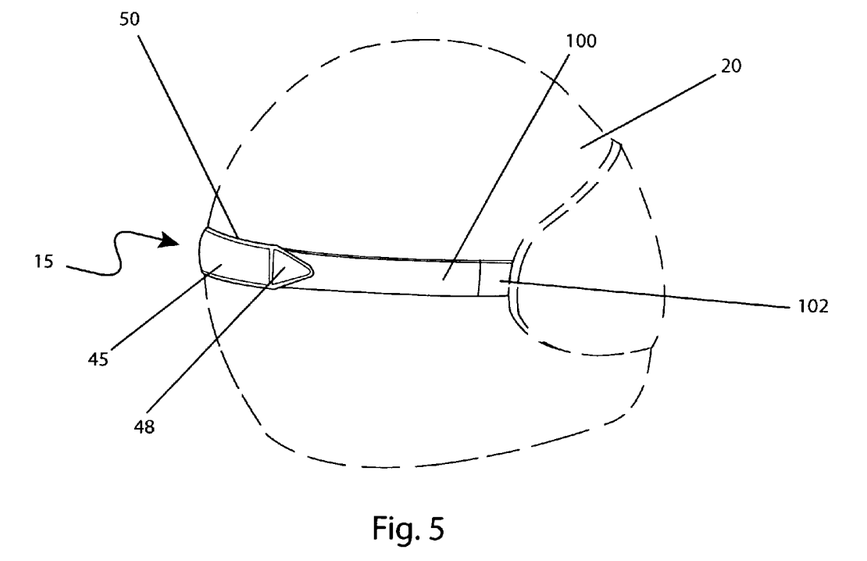
FIG. 5 is a perspective view of an alternate attachment method of the light display unit 15 thereto a conventional motorcycle helmet 20, according to an alternate embodiment of the present invention; and, FIG. 6 is an electrical block diagram depicting the electrical portions of the wireless illuminated indicators for motorcycle helmets 10, according to the preferred embodiment of the present invention.

The best mode for carrying out the invention is presented in terms of its preferred embodiment, herein depicted within FIGS. 1 through 4 and FIG. 6 as well as in terms of its alternate attachment method, herein depicted within FIG. 5. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an apparatus and method for wireless illuminated indicators for motorcycle helmets (herein described as the "apparatus") 10, comprising wireless brake and turn signal indicators being attached thereto existing motorcycle helmets 20 by a user 25. The braking and turning light display unit 15 is attached thereto a rear surface of the helmet 20 by means of either double-sided adhesive 95 or an elastic strap 100 and is electrically powered by a rechargeable battery pack 120. The light display unit 15 receives a radio frequency (RF) signal 110 therefrom a transmitter assembly 75 in electrical communication with existing brake and turn signal indication circuits of the motorcycle 35. In such a manner, the helmet-mounted light display unit 15 will illuminate a red brake light 45 whenever the motorcycle brakes are applied, in much the same manner as a center-mounted high brake light on motor vehicles. The light display unit 50 also indicates turning direction by illumination of a left turn signal assembly 47 and a right turn signal assembly 48. The elevated location of the light display unit indicators 15 provides increased visibility thereto following traffic.

Figure 1:
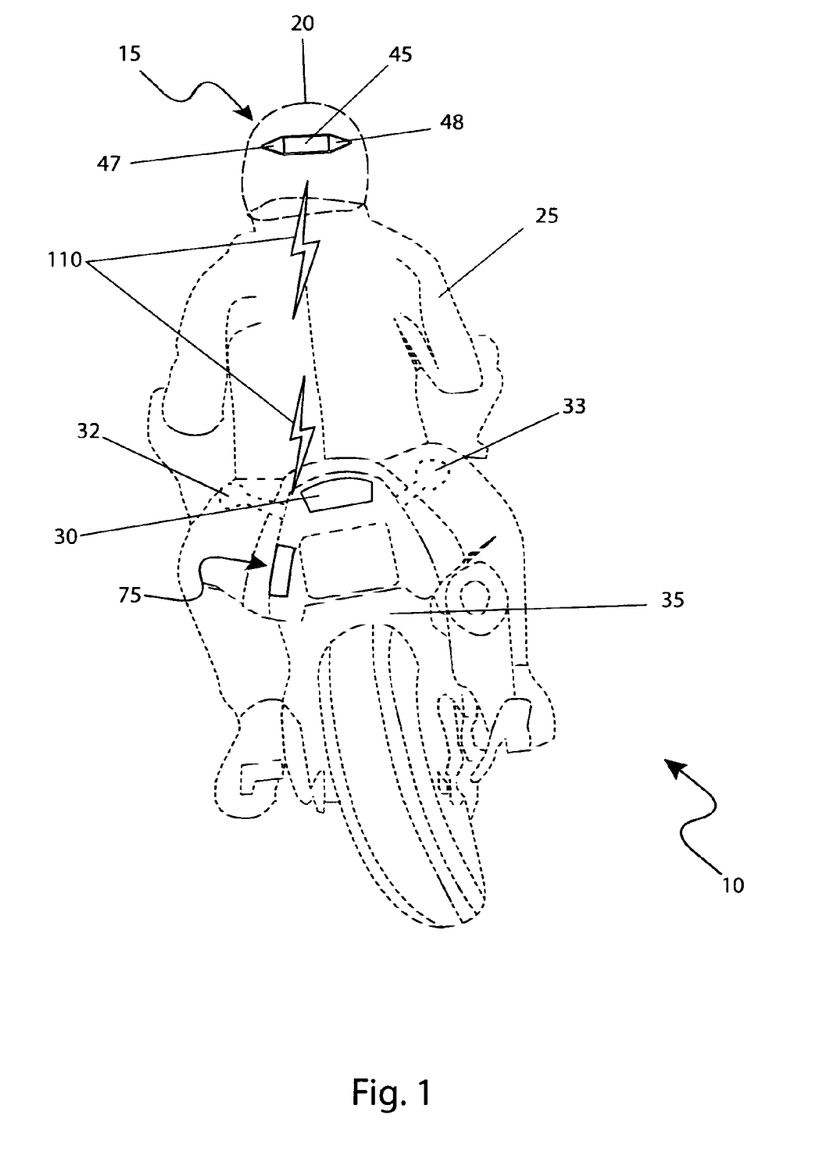
FIG. 1 is a pictorial representation of wireless illuminated indicators for motorcycle helmets 10 depicting a utilized state, according to the preferred embodiment of the present invention.

Referring now to FIG. 1, a pictorial representation of the apparatus 10 depicting a utilized state, according to the preferred embodiment of the present invention, is disclosed. The apparatus 10 comprises a light display unit 15 and a transmitter assembly 75. The light display unit 15 comprises an integral RF receiver and is mounted thereto a rear surface of a conventional motorcycle helmet 20, as worn by a motorcycle rider 25. The light display unit 15 is affixed thereto the helmet 20 using a semi-permanent adhesive element 95. The functionality of the light display unit 15 mimics the functionality of conventional motorcycle mounted lights including the brake light 30, the left turn signal 32, and the right turn signal 33. When the motorcycle rider 25 is in his or her normal riding position on a motorcycle 35, the light display unit 15 is at a higher level than the conventional motorcycle mounted brake light 30 and turn signals 32, 33. This higher level leads to increased visibility of the light display unit 15 and thus increased safety by providing an increased reaction time for motorists that are following the motorcycle rider 25 during travel. The light display unit 15 is of a wireless nature such as to not impede the motorcycle rider 25 in any way. Said light display unit 15 is powered by a rechargeable battery pack 120 and receives control RF signals 110 wirelessly from the motorcycle mounted transmitter assembly 75. In addition to the brake indication functionality of the apparatus 10, the light display unit 15 also provides indication of intended turning direction as well. Such indication is accomplished by the use of an integral left turn signal assembly 47 and an integral right turn signal assembly 48 located at opposing outer edge regions thereof being sequentially illuminated in a path to the right or the left to indicate an upcoming right or left turn respectively. Said turn signal assemblies 47, 48 comprise arrow-shaped lamp arrays; however, those skilled in the art will quickly realize that other methods of indicating intended turns may be provided such as dedicated lamps, shadow overlays, and the like working equally well, and as such, should not be interpreted as a limiting factor of the present invention 10.

Figure 2:
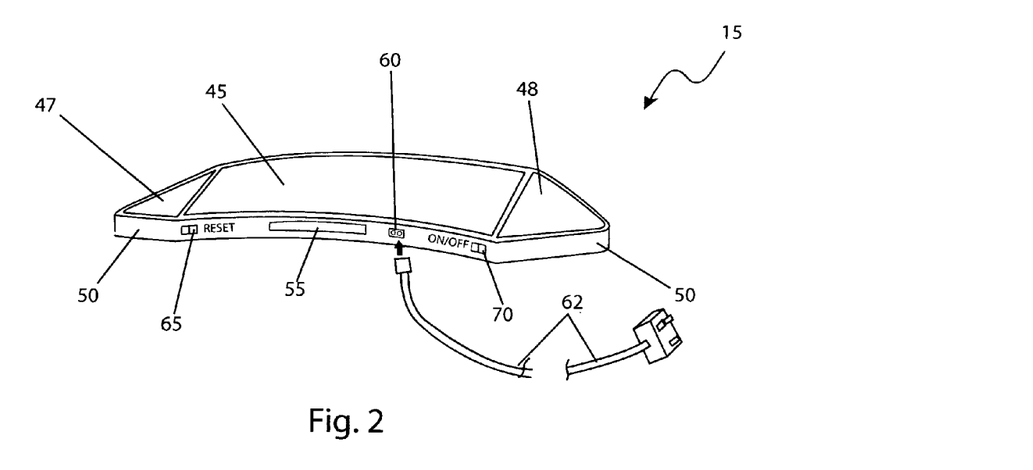
FIG. 2 is a perspective view of the light display unit portion 15, according to the preferred embodiment of the present invention.

Referring now to FIG. 2, a perspective view of the light display unit 15, according to the preferred embodiment of the present invention, is disclosed. The light display unit 15 comprises a brake light assembly 45, a left turn signal assembly 47, and a right turn signal assembly 48 being mounted atop a flexible backplane enclosure 50. The overall size of the light display unit 15 is envisioned to be approximately one (1) to two (2) inches tall, approximately six (6) inches wide, and approximately one-half (½) inch thick. The flexible nature of the flexible backplane enclosure 50 allows the light display unit 15 to conform itself to a profile of the motorcycle helmet 20. No matter the shape or overall circumference of the motorcycle helmet 20, the light display unit 15 will fit snugly and securely against it. A battery pack access door 55 is provided on the light display unit 15 which houses a rechargeable battery pack 120. The battery pack 120 is recharged through a recharging port 60. The recharge unit 62 comprises a common 120 AC to DC adapter with expected features such as a mating electrical connector, a cord, and a plug. Located thereupon an external side surface of the flexible backplane enclosure 50, is a receiver reset pushbutton 65 which pairs the receiver portion of the light display unit 15 therewith a specific transmitter assembly 75. Also located on an external side surface of the flexible backplane enclosure 50 is a power switch 70 which allows the light display unit 15 and affixed lighted lamps 45, 47, 48 to be de-energized during periods of nonuse, or when two or more motorcycle riders 25 are on a motorcycle 35 such that only the most rearward motorcycle rider 25 is provided with an operational light display unit 15.

Referring now to FIG. 3, a perspective view of the transmitter assembly 75, according to the preferred embodiment of the present invention, is disclosed. The transmitter assembly 75 comprises a weatherproof plastic enclosure 80, a transmitter unit 77, and a wiring harness 85. The connection wiring harness 85 extends from the weatherproof plastic enclosure 80 with an adequate length to allow for termination anywhere on the motorcycle 35. The connection wiring harness 85 comprises a minimum of four (4) individual conductors as follows: (1) ground connection, (2) brake signal connection, (3) right turn signal connection, and (4) left turn signal connection. Thus, whenever a signal therefrom the motorcycle brake system, or a signal therefrom one of the turn signal indications is initiated by the operator 25, power would be applied to the transmitter unit 77 and a corresponding wireless RF signal 110 would emanate therefrom. It is envisioned that the connection from the connection wiring harness 85 to the associated corresponding wire or electrical connection on the motorcycle 35 would be made by a tap or splice connection using a wide variety of well known methods. In such a manner the integrity of the original motorcycle wiring is not negatively affected. However, it is understood that said connection may also be provided on a terminal strip located inside of the weatherproof plastic enclosure 80 by way of a "pass-thru" connection without deviating from the basic concept and as such should not be interpreted as a limiting factor of the present invention 10. The overall size of the weatherproof plastic enclosure 80 is such that it can be easily concealed anywhere on a motorcycle 35. The weatherproof plastic enclosure 80 further comprises molded mounting apertures 82 located at each corner area being suitable for mounting options such as, but not limited to, zip-ties, bolts, screws, and the like. Said materials are to be supplied with the weatherproof plastic enclosure 80 for said attachment options as well as additional means such as double-faced tape, a hook-and-loop strip, or the like. A transmitter reset pushbutton 90 is located on the side of the weatherproof plastic enclosure 80 as shown. The transmitter reset pushbutton 90 is used to pair the weatherproof plastic enclosure 80 with a specific light display unit 15. It is also envisioned that the transmitter assembly 75 would be provided as part of a kit with the apparatus 10 which would include the light display unit 15. However, the transmitter assembly 75 could be supplied as standard or optional equipment on new motorcycles as well, and as such, the installation method of the transmitter assembly 75 should not be considered a limiting factor of the present invention 10.

Referring now to FIG. 4, a perspective view of the preferred attachment method of the light display unit 15 thereto a conventional motorcycle helmet 20, according to the preferred embodiment of the present invention, is disclosed. Depiction of said preferred attachment method is of a semi-permanent nature and would be used for long periods of time. In said installation, the light display unit 15, comprising the outward facing lens assemblies 45, 47 (not shown here), 48 and the flexible backplane enclosure 50 is held in place with the use of an adhesive element 95. The adhesive element 95 comprises common weatherproof double-sided foam tape; however, other materials such as glue or adhesives may be used as well, and as such, should not be interpreted as a limiting factor of the present invention 10. The attachment method depicted herein does not impact the structural integrity or safety element of the motorcycle helmet 20 should an accident occur.

Referring now to FIG. 5, a perspective view of an alternate attachment method of the light display unit 15 thereto a conventional motorcycle helmet 20, according to an alternate embodiment of the present invention, is disclosed. The alternate attachment method depicted here is of a temporary nature and would be used while wearing a different helmet 20, a helmet 20 that one does not wish to semi-permanently attach the light display unit 15 thereto, or when borrowing or renting a helmet 20. In said installation, the light display unit 15 is held in place with the use of a mechanical strap 100. The strap 100 comprises an elastic textile element; however, said strap 100 may comprise other fastening methods such as a nylon strap with an associated length adjustment buckle, or the like, and as such should not be interpreted as a limiting factor of the present invention. The strap 100 further comprises a pair of metal strap hooks 102 at distal ends thereto being attach to opposing outer edges of a front opening of the motorcycle helmet 20. The alternate attachment method of coupling the light display unit 15 thereto the motorcycle helmet 20 would not impact the structural integrity or safety element of the motorcycle helmet 20 should it be involved in a crash.

Figure 6:
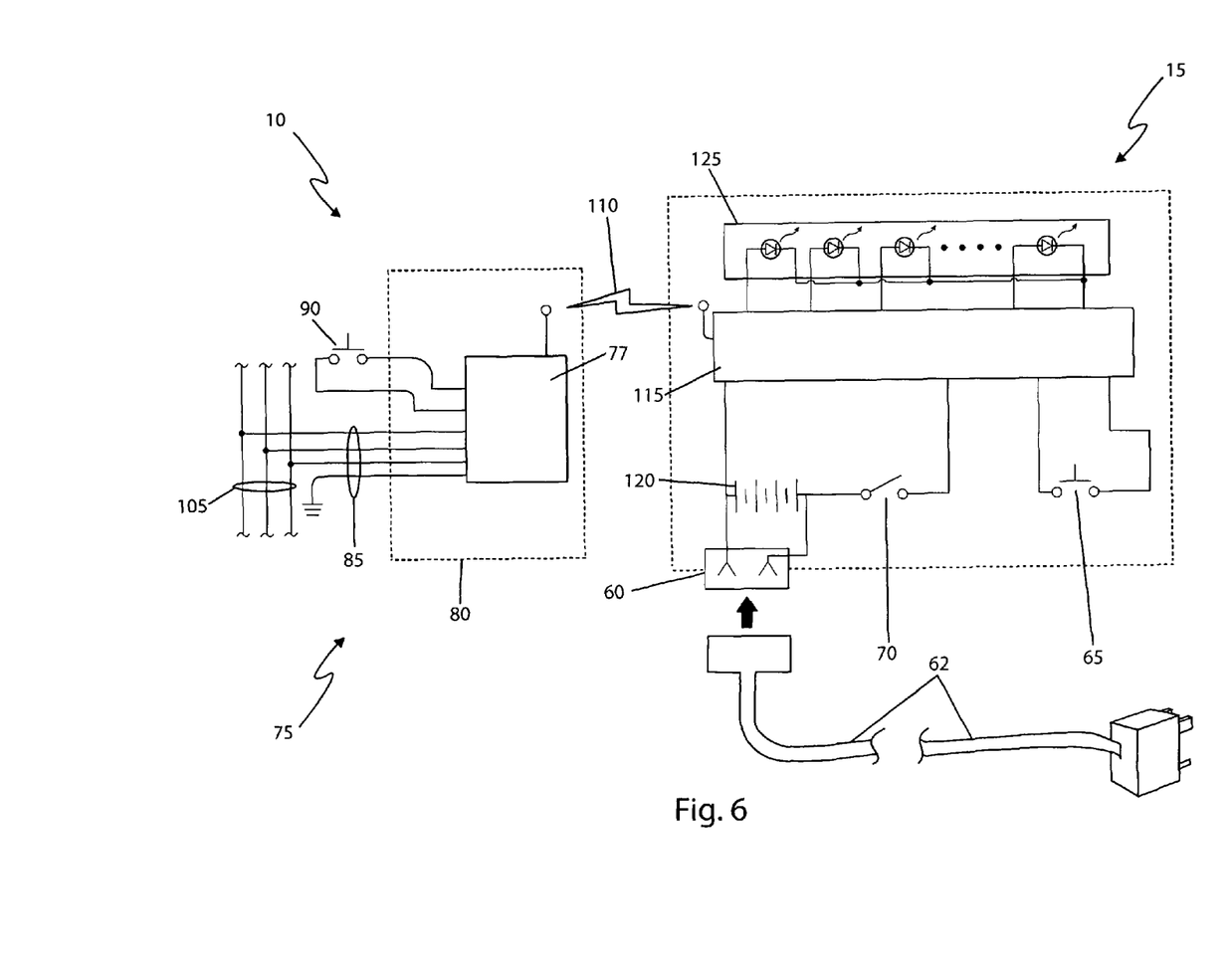

Referring now to FIG. 6, an electrical block diagram depicting the electrical portions of the apparatus 10, according to the preferred embodiment of the present invention, is disclosed. The transmitter unit 77 located inside of the weatherproof plastic enclosure 80 is connected to a motorcycle wiring system 105 as shown. Additionally, the transmitter reset pushbutton 90 is electrically coupled to the transmitter unit 77 as well. In the instance where either the brake system and/or the turning indication system of the motorcycle 35 are activated, a corresponding RF signal 110 is generated by the transmitter unit 77. The RF signal 110 would be of a safe-low level design that is authorized for low-power, short-range, communications by the authority having jurisdiction. The RF signal 110 is then received by a receiver module 115 inside the light display unit 15. The light display unit 15 receives power from a rechargeable battery pack 120 located inside of the flexible backplane enclosure 50. The rechargeable battery pack 120 is recharged via connection of the recharge unit 62 thereto the recharging port 60. Electric power is controlled by the power switch 70 as shown. In such a manner, the power switch 70 allows the rechargeable battery pack 120 to be conserved when the apparatus 10 is not in use. The receiver reset pushbutton 65 is also coupled into the receiver module 115 to aid in the pairing process with the transmitter assembly 75. Finally, an illumination means array 125 is provided as an output of the receiver module 115. The illumination means array 125 comprises high-intensity light emitting diodes (LED's) as shown due to their low power consumption, long life and good visibility, although other illumination means such as incandescent lamps can also used, and as such, should not be interpreted as a limiting factor of the present invention.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be installed as indicated in FIGS. 1 and 4 or in terms of the alternate attachment method as indicated in FIG. 5.

The method of installing and utilizing the preferred embodiment of the apparatus 10 may be achieved by performing the following steps: fastening the light display unit 15 to the motorcycle helmet 20 using the adhesive element 95; charging the rechargeable battery pack 120 by connecting the recharge unit 62 thereto the recharging port 60 on the flexible backplane enclosure 50 and plugging said recharge unit 62 into a common household 120-volt outlet; installing the transmitter assembly 75 by positioning in a secure, but accessible location, on the motorcycle 35; routing the connection wiring harness 85 to a suitable location where electrical connections can be made to the motorcycle wiring system 105 comprising the following four signals; (1) ground connection, (2) brake signal connection, (3) right turn signal connection, and (4) left turn signal connection; performing the pairing process to enable the association of one (1) transmitter unit 77 thereto one receiver module 115; and, benefiting from improved motorcycle riding safety due to increased visibility of braking and turning indicators 45, 47, 48 afforded a user of the present invention 10.

The method of installing and utilizing the alternate attachment method of the apparatus 10 may be achieved by performing the following additional steps: affixing the light display unit 15 to the motorcycle helmet 20 using the strap and strap hooks 102 being attached thereto opposing outer edges of a front opening of the motorcycle helmet 20 in lieu of the aforementioned preferred adhesive element 95.

The pairing process is necessary to align the transmitter unit 77 and receiver 115 in combination to each other thus preventing interference therefrom additional users of the apparatus 10 being in close proximity thereto. In such a manner, two motorcycles 35, both equipped with the apparatus 10 can ride near one another without causing cross-activation. Such a process is necessary when buying a new helmet or motorcycle which may have the features of the apparatus 10 already installed. The pairing feature also allows the light display unit 15 to be used with multiple or different transmitters assemblies 75 provided on different motorcycles 35.

To perform the pairing process the user 25 would apply power to the light display unit 15 through use of the power switch 70. Then with the brake system on the motorcycle 35 activated to apply power to the transmitter assembly 75, the user 25 would press both the receiver reset pushbutton 65 and the transmitter reset pushbutton 90 simultaneously or within a short time of one another. In this training or learning mode, the signature of the transmitter unit 77 would be learned by the receiver module 115 and only respond to the paired transmitter unit 77 in the future until it is re-paired with another transmitter unit 75. At this point in time, the apparatus 10 is ready for use.

As aforementioned, the use of the apparatus 10 is accomplished in a transparent manner thereto the motorcycle rider 25. Whenever the motorcycle rider 25 applies the brake system and the conventional motorcycle mounted brake light 30 illuminates, a corresponding RF signal 110 is generated by the transmitter unit 77 and received by the receiver module 115, thus causing the illumination means array 125 to illuminate as well. In a similar manner, the motorcycle turn signals 32, 33 indicate an upcoming right or left turn causing the illumination means array 125 to illuminate as well. After use, the apparatus 10 is deactivated by turning power off the light display unit 15 by use of the power switch 70. The apparatus 10 can be safely stowed at this point whereupon it may be used again at a future time following the above sequence.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A signal display system for a motorcycle helmet, comprising:
   a display unit attachable thereto a motorcycle helmet with an attachment means and further comprising an illumination means;
   a power source for providing power thereto said display unit;
   a control means for controlling said display unit and in electrical communication therewith; and,
   an electrical connection means in electrical communication therewith said control means and existing motorcycle brake signal indicators and turn signal indicators; and,
   wherein said system is used by a motorist operating a motorcycle;
   wherein said display unit mimics said existing motorcycle brake signal indicators and turn signal indicators when activated; and,
   wherein said display unit is mounted thereto said motorcycle helmet such that increased visibility thereof said display unit is afforded thereto following traffic.

2. The system of claim 1, wherein said control means comprises wireless communication further comprising:
   a transmitter assembly for generating and transmitting an RF signal removably mounted thereto said motorcycle;
   said electrical connection means transmitting a brake signal, a left turn signal, and a right turn signal from existing motorcycle brake signal indicators and turn signal indicators thereto said transmitter assembly; and,
   a receiver assembly integral therewith said light display unit;
   wherein said receiver assembly receives said RF signal wirelessly from said transmitter assembly; and,
   wherein said wireless communication provides an increased safety motorcycle operating means therefor said motorist, such that said control means does not impede operation of said motorcycle.

3. The system of claim 2, wherein said transmitter assembly further comprises:
   a weatherproof plastic enclosure comprising a mounting means thereto said motorcycle;
   a transmitter unit;
   a transmitter reset pushbutton is located thereon said enclosure; and,
   said electrical connection means in electrical communication therewith said transmitter unit;
   wherein said enclosure comprises a low profile; and,
   wherein said electrical connection means extends from said enclosure with an adequate length to allow for termination anywhere on said motorcycle.

4. The system of claim 2, wherein said RF signal is a brake signal, a left turn signal, and a right turn signal.

5. The system of claim 4, wherein said display unit further comprises:
   a flexible backplane enclosure;
   a brake signal display centrally located thereof said enclosure;
   a left turn signal display located left thereof said brake signal display;
   a right turn signal display located right thereof said brake signal display;
   said power source comprising:
      a rechargeable battery pack housed therein an access door located thereon said enclosure; and,
      a recharging port located adjacent thereto said access door;
   a power switch located thereon said enclosure for providing power thereto said brake signal display, left turn signal display, and right turn signal display therefrom said power source;
   a receiver reset pushbutton located thereon said enclosure;
   wherein said backplane enclosure is flexible thereby allowing said display unit to conform thereto a profile of said motorcycle helmet;
   wherein said brake signal display is illuminated upon receipt thereof a brake signal;
   wherein said left turn signal display is illuminated upon receipt thereof a left turn signal; and,
   wherein said right turn signal display is illuminated upon receipt thereof a right turn signal.

6. The system of claim 5, wherein said left turn signal display and right turn signal display each comprise arrow-shaped lamp arrays.

7. The system of claim 5, wherein said display unit is illuminated at a higher level than said existing motorcycle brake signal indicators and turn signal indicators when said motorist is in a normal riding position thereon said motorcycle.

8. The system of claim 1, wherein said display unit is mounted thereto a rear surface of a conventional motorcycle helmet.

9. The system of claim 8, wherein said attachment means comprises an adhesive element.

10. The system of claim 8, wherein said attachment means comprises:
    an elastic textile strap;
    an associated length adjustment buckle; and,
    a pair of metallic strap hooks at opposing distal ends thereof said strap thereto being attachable thereto opposing outer edges of a front opening of said motorcycle helmet.

11. A signal display system for a motorcycle helmet, comprising:
    a transmitter assembly for generating and transmitting an RF signal removably mounted thereto said motorcycle, further comprising an electrical connection means in electrical communication therewith existing motorcycle brake signal indicators and turn signal indicators;
    a display unit attachable thereto a motorcycle helmet with an attachment means and further comprising an illumination means, further comprising:
       a receiver assembly integral therewith said light display unit;
       a flexible backplane enclosure;
       a brake signal display centrally located thereof said enclosure;
       a left turn signal display located left thereof said brake signal display;
       a right turn signal display located right thereof said brake signal display;
       a power source for providing power thereto said display unit;
       a power switch located thereon said enclosure for providing power thereto said brake signal display, left turn signal display, and right turn signal display therefrom said power source; and,
       a receiver reset pushbutton located thereon said enclosure;

a control means for controlling said display unit and in electrical communication therewith; and, wherein said system is used by a motorist operating a motorcycle;

wherein said display unit mimics said existing motorcycle brake signal indicators and turn signal indicators when activated;

wherein said display unit is mounted thereto said motorcycle helmet such that increased visibility thereof said display unit is afforded thereto following traffic.

12. The system of claim 11, wherein said transmitter assembly further comprises:
 a weatherproof plastic enclosure comprising a mounting means thereto said motorcycle;
 a transmitter unit;
 a transmitter reset pushbutton is located thereon said enclosure; and,
 said electrical connection means in electrical communication therewith said transmitter unit;
 wherein said enclosure comprises a low profile;
 wherein said electrical connection means extends from said enclosure with an adequate length to allow for termination anywhere on said motorcycle;
 wherein said electrical connection means transmits a brake signal, a left turn signal, and a right turn signal from said existing motorcycle brake signal indicators and turn signal indicators thereto said transmitter assembly;
 wherein said enclosure comprises a low profile; and,
 wherein said electrical connection means extends from said enclosure with an adequate length to allow for termination anywhere on said motorcycle.

13. The system of claim 11, wherein said power source further comprises:
 a rechargeable battery pack housed therein an access door located thereon said enclosure; and,
 a recharging port located adjacent thereto said access door.

14. The system of claim 11, wherein said backplane enclosure is flexible thereby allowing said display unit to conform thereto a profile of said motorcycle helmet.

15. The system of claim 11, wherein said brake signal display is illuminated upon receipt thereof a brake signal, said left turn signal display is illuminated upon receipt thereof a left turn signal, and wherein said right turn signal display is illuminated upon receipt thereof a right turn signal.

16. The system of claim 11, wherein said left turn signal display and right turn signal display each comprise arrow-shaped lamp arrays.

17. The system of claim 11, wherein said display unit is illuminated at a higher level than said existing motorcycle brake signal indicators and turn signal indicators when said motorist is in a normal riding position thereon said motorcycle.

18. The system of claim 11, wherein said display unit is mounted thereto a rear surface of a conventional motorcycle helmet.

19. The system of claim 11, wherein said attachment means comprises an adhesive element.

20. The system of claim 11, wherein said attachment means comprises:
 an elastic textile strap;
 an associated length adjustment buckle; and,
 a pair of metallic strap hooks at opposing distal ends thereof said strap thereto being attachable thereto opposing outer edges of a front opening of said motorcycle helmet.

* * * * *